Dec. 11, 1928.

R. E. HALL 1,694,653

ELECTROLYTE AND ELECTROLYTIC APPARATUS

Filed Oct. 14, 1922

Inventor:
Ray E. Hall
By: Wm. O. Belt
Atty.

Patented Dec. 11, 1928.

1,694,653

UNITED STATES PATENT OFFICE.

RAY E. HALL, OF EVANSTON, ILLINOIS, ASSIGNOR TO HALL RESEARCH CORPORATION, OF CHICAGO, ILLINOIS, A CORPORATION OF DELAWARE.

ELECTROLYTE AND ELECTROLYTIC APPARATUS.

Application filed October 14, 1922. Serial No. 594,486.

This invention is based upon the well known fact that an electromotive force less than the minimum necessary to effect complete electrolysis may send a relatively strong current through an electrolyte for a limited time until the opposing electromotive force has reached an equal value when equilibrium will be established. I have found that by disturbing the electrolyte either mechanically or electrically in certain ways the equilibrium can be overcome and the electrolyte partially or totally restored to normal condition with the result that an additional current will flow which will depend for strength and duration upon the nature and duration of the disturbance.

The principal object of the invention is to use this phenomenon, sometimes called electrolytic convection, to cause a flow of current upon the happening of some controlling circumstance.

A further object of the invention is to permit a signal to be relayed by causing it to act upon an electrolyte when the circuit is in equilibrium in such a way as to restore the electrolyte wholly or partially to normal condition and thereby cause a current to flow through the circuit.

A further object of the invention is to produce an instrument that will supply a current of electricity upon the happening of a selected event and that will bear a definite relation to the characteristics of that event.

A further object of the invention is to produce an electrolyte in which the phenomenon of electrolytic convection is more pronounced and the currents produced are stronger than in the electrolytes heretofore used.

Figure 1:
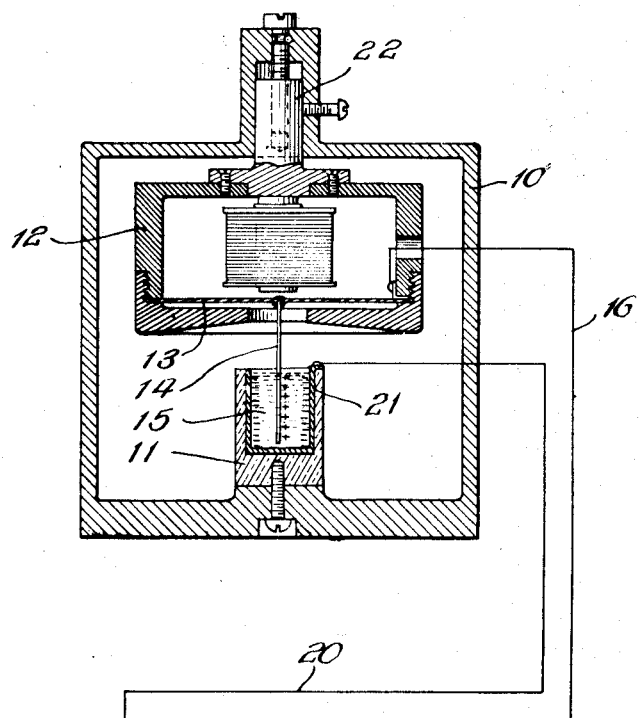
Figure 2:
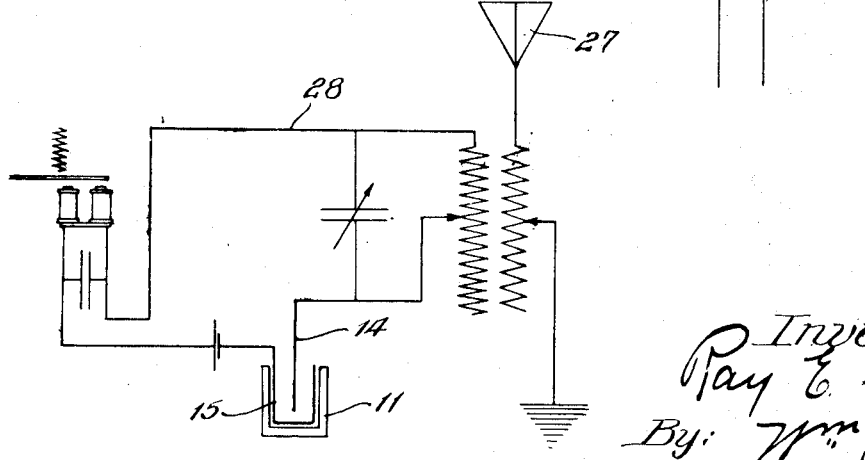

Further objects of the invention will become apparent as the disclosure proceeds and the description is read in connection with the accompanying drawings illustrating selected embodiments of the invention, and in which Fig. 1 is a diagrammatic view illustrating an apparatus including a telephone receiver for disturbing the equilibrium of an electrolyte; and Fig. 2 is a similar view illustrating one way of disturbing the electrolyte electrically.

In Fig. 1, 10 indicates a frame in which a cell 11 is suitably supported beneath a telephone 12. The diaphragm 13 of the telephone is equipped with a platinum agitator 14 projecting into the electrolyte 15 contained in the cell 11. This agitator forms one pole of the cell and is connected by suitable wiring as indicated at 16 with the solenoid of a magnet 17 which is connected through the battery 18 and the wires 19 and 20 to the other pole 21 of the cell. The telephone may be adjustably mounted as indicated at 22 to permit the depth of the agitator to be varied as conditions may require. The magnet 17 operates a leaf 23 to close the contacts 24 and 25 of a circuit including a battery or the like 26 and some form of detector, relay or the like.

If the E. M. F. of the battery 18 is less than the minimum necessary to produce complete electrolysis in the cell 11, a current will flow through the circuit until the counter E. M. F. builds up and produces a state of equilibrium. This action is only momentary and appears to be caused by the phenomenon known as electrolytic convection. This phenomenon consists in the separation of the ions causing a polarization of the cell, a current passing through the electrolyte for the instant necessary to cause this result. A counter E. M. F. is built up which almost at once stops the flow of current. A slight disturbance of the electrolyte tends to restore the ions to their former relationship and then the electrolyte again becomes a conductor. I employ this phenomenon, for example, as a means for relaying a signal. When a signal is received by the telephone illustrated in Fig. 1, the electrode 14 is vibrated, thus causing disturbance of the electrolyte, this disturbance corresponding with the duration of the signal. Current will therefore flow through the circuit which includes the battery 18 and this current will be a pulsating one, whose pulsations correspond to the duration of the signal. It will be obvious that this apparatus is capable of using alternating current to control a direct current flow.

In Fig. 2 I have illustrated an apparatus for disturbing the electrolyte electrically instead of mechanically as in Fig. 1. In this arrangement wireless signals received by the antenna 27 induce alternating pulsations in the local circuit 28 which is connected to poles 14 and 15 of the cell 11. These pulsations passing through the cell break down the equilibrium and permit current to again flow in substantially the same way as when the electrolyte is mechanically disturbed.

From these two examples it will be clear that apparatus depending upon electrolytic convection can be made to perform a great variety of functions by causing some circumstance or event to disturb the equilibrium of the electrolytic circuit and using the resulting flow of current to operate some device. The form of the apparatus will depend largely upon the conditions of the particular case, but these examples will be sufficient to illustrate how particular devices may be made and will operate according to the method described.

Any suitable electrolyte may be used in the cell 11 but those in common use give such small currents that I prefer to use certain compounds or substances that I have found to give relatively strong currents. Iodine produces the best electrolytes with which I am familiar. By dissolving iodine in potassium iodide, sodium iodide, hydriodic acid etc., a polyiodide is formed that is not only a good conductor but the phenomenon of electrolytic convection is accompanied by a comparatively great flow of current which makes apparatus of the kinds described operable by much feebler currents than with the old electrolytes. Generally speaking the polyiodides make very satisfactory electrolytes for this purpose.

This electrolyte is very active chemically on most substances and for that reason I prefer to make the poles 14 and 21 of platinum which is the only metal I have found that will resist its action. The pole 21 should be in effect a liner for the cell 11, if it is to be made of hard rubber or the like in accordance with the customary practice. Obviously the electrodes or poles 14 and 21 must both be of a material which will not be materially affected by the action of the polyiodide forming the electrolyte, or otherwise a continuous electrolytic action would be carried on which would defeat the object of the invention. The electrodes or poles should, therefore, not only not be acted on by the electrolyte, but should also be of the same materials, or of materials which stand at about the same place in the electromotive series, for example, platinum and carbon.

While electrolytes made according to this invention are particularly useful in connection with apparatus operating according to the method described and in which the E. M. F. is less than the minimum necessary to produce complete electrolysis, but it will be understood that in some cases higher E. M. F. may be used without vitiating the results; and it will also be understood that the new electrolytes can be used for a variety of purposes other than that described.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In a device of the class described, a cell, an electrolyte in said cell, and electrodes in said cell, said electrodes being of materials which are not materially affected by action of said electrolyte, a circuit including said electrodes and said electrolyte, signal receiving means, and mechanical means connected to said signal receiving means and adapted to disturb said electrolyte, for the purpose set forth.

2. A device of the class described, a cell having an electrolyte and electrodes therein, a circuit including said electrolyte and electrodes and a source of current, said source of current adapted to cause electrolytic convection in said electrolyte, signal receiving means, and mechanical means connected to said signal receiving means and adapted to disturb said electrolyte, for the purpose set forth.

RAY E. HALL.